(12) United States Patent
Tang et al.

(10) Patent No.: US 10,677,335 B2
(45) Date of Patent: Jun. 9, 2020

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN); Yanshuai Fu, Weihai (CN)

(73) Assignee: WEIHAI TUANZHONG TRANSMISSION CO., LTD., Weihai, Shangdong Province (CN)

( * ) Notice: Subject to any disclaimer, the term of this patent is extended or adjusted under 35 U.S.C. 154(b) by 0 days.

(21) Appl. No.: 16/479,529

(22) PCT Filed: Mar. 2, 2018

(86) PCT No.: PCT/CN2018/077818
§ 371 (c)(1),
(2) Date: Jul. 19, 2019

(87) PCT Pub. No.: WO2018/210031
PCT Pub. Date: Nov. 22, 2018

(65) Prior Publication Data
US 2019/0383376 A1   Dec. 19, 2019

(30) Foreign Application Priority Data
May 16, 2017   (CN) .......................... 2017 1 0342266

(51) Int. Cl.
*F16H 47/08*     (2006.01)
*F16H 47/12*     (2006.01)

(52) U.S. Cl.
CPC ............. *F16H 47/08* (2013.01); *F16H 47/12* (2013.01); *F16H 2702/00* (2013.01); *F16H 2702/02* (2013.01)

(58) Field of Classification Search
CPC ...... F16H 47/08; F16H 47/12; F16H 2702/00; F16H 2702/02
(Continued)

(56) References Cited

U.S. PATENT DOCUMENTS 1,691,612 A   11/1928   John et al.
1,933,143 A   10/1933   Oscar
(Continued)

FOREIGN PATENT DOCUMENTS

CH   615004 A5 * 12/1979   ............. F16H 47/12
DE   452368 C  * 11/1927   ............. F16H 47/12
(Continued)

*Primary Examiner* — Leslie A Nicholson, III
(74) *Attorney, Agent, or Firm* — Platinum Intellectual Property LLP (57) ABSTRACT

Provided is a continuously variable transmission capable of solving a technical problem in which upon activation of a continuously variable transmission, speed increase in vaned-wheel power density is low and unable to meet the requirement for rapidly increasing output torque. The present continuously variable transmission comprises a planetary gear set (101) at an input end and a planetary gear set (102) at an output end. A planetary carrier (104) having a cavity is provided between the planetary gear set (101) at the input end and the planetary gear set (102) at the output end. The planetary carrier (104) comprises an input end cover (6) and an output end cover (13). A vaned-wheel housing (14) having a cavity is fixed between the input end cover (6) and the output end cover (13). An inner side of the planetary gear set (101) at the input end is connected to the input end cover (6). An inner side of the planetary gear set (102) at the output end is connected to the output end cover (13). A vaned-wheel-based planetary gear set (103) is provided at one internal side of the vaned-wheel housing (14).

10 Claims, 9 Drawing Sheets

(58) Field of Classification Search
USPC .......................................................... 475/59
See application file for complete search history.

(56) References Cited

U.S. PATENT DOCUMENTS

| | | | |
|---|---|---|---|
| 2,293,547 A | | 8/1942 | Frederick |
| 3,323,390 A | | 6/1967 | Hendrik et al. |
| 3,334,529 A | * | 8/1967 | Cancrinus ............... F16H 47/12 |
| | | | 475/111 |

FOREIGN PATENT DOCUMENTS

| DE | 923230 C | * | 2/1955 | ............. F16H 47/12 |
|---|---|---|---|---|
| DE | 1295950 B | * | 5/1969 | ............. F16H 47/12 |

* cited by examiner

CONTINUOUSLY VARIABLE TRANSMISSION

RELATED APPLICATIONS

This application is a United States National Stage Application filed under 35 U.S.C 371 of PCT Patent Application Serial No. PCT/CN2018/077818, filed Mar. 2, 2018, which claims Chinese Patent Application Serial No. CN 201710342266.8, filed May 16, 2017, the disclosure of all of which are hereby incorporated by reference in their entirety.

BACKGROUND OF THE INVENTION

Field of the Invention

The present invention relates to a mechanical transmission apparatus and more particularly, to a continuously variable transmission.

Description of the Related Art

In the field of transmission, transmissions are applied most widely in the automobile field. At present, automotive transmissions are classified according to manipulation manner into: manual transmission (MT), automatic transmission (AT) and manual automatic integrated transmission. With the rapid development of automobiles from day to day, the automatic transmission has gradually occupied a mainstream of the automobile due to its simple manipulation, and the automatic transmission automobile achieves the purpose of shifting by means of hydraulic transmission and gear combination. Automatic transmissions are further classified into hydraulic automatic transmission (AT), electronically controlled mechanical automatic transmission (AMT) and continuously variable transmission (CVT). Among them, the most widely applied and most loaded component is hydraulic torque converter. However, the existing transmissions universally have the following problems:

(1) In the hydraulic torque converter, the power is transmitted to a pump wheel which is connected to housing, the pump wheel agitates a fluid in the torque converter and drives, through a guide wheel, a turbine to rotate, and then the turbine outputs the power. The disadvantage thereof is that: when a difference between rotation speeds of the pump wheel and the turbine of the hydraulic torque converter is close to synchronization, transmission capacity will be lost and synchronization can't be achieved; however, when a control system is added to overcome the above existed problems of the hydraulic torque converter, it further causes problems of complicated system and high manufacturing cost.

(2) The existing continuously variable transmission (CVT) transmits power by using a transmission belt in which driving and driven wheels having variable transmission friction forces and working diameters cooperate with each other, and may achieve a continuously change of transmission ratio, thereby obtaining a best match of power train and engine working conditions. The disadvantage thereof is that: flexibly activation with zero can't be provided, a large torque can't be provided, and it tends to slip when the applied force changes frequently.

(3) Chinese Patent No. 102606709B discloses a hydraulic double-speed synchronizer, the disadvantage of which is that: the balance force between the bucket wheel and the fluid is limited, and the torque may only be changed within the maximum balance force of the fluid to the bucket wheel; the fluid in the inner casing needs to be discharged when the output shaft needs to provide a torque larger than the torque that the maximum balance force of the fluid to the bucket wheel can provide, and the gear mechanism participating in braking has a conventional structure of a planetary gear reducer which does not have a flexible transmission function; and the entire control system belongs to a electronic control system, and the structure of the apparatuses for control, braking and the like are complicated.

(4) Chinese invention application No. 201710055648.2 filed by the applicant discloses a continuously variable transmission, and the technical solution thereof is that the bucket wheel planetary gear set is located on the side close to the cavity output end cover. The disadvantage of this structure is that: when the transmission system is in a condition where a rapid increase of output torque is required upon activation or acceleration, the revolution speed of the cavity planetary gear carrier is reduced in proportion while the input end planetary gear set and the output end planetary gear set achieve the increase of the torque through enlargement of diameter twice, and the rotation speed of the bucket wheel planetary gear is dependent on the revolution speed of the cavity planetary gear carrier, thereby, the increase of the power density of the bucket wheel is slow in this structure, and it is not suitable for the condition where a rapid increase of output torque is required.

SUMMARY OF THE INVENTION

The present invention is to solve the technical problems that: when a continuously variable transmission is in a condition where a rapid increase of output torque is required, upon activation or acceleration, the revolution speed of the cavity planetary gear carrier is reduced in proportion while the output torque is increased after the twice enlargement of diameter of the input end planetary gear set and the output end planetary gear set, and the rotation speed of the bucket wheel planetary gear is dependent on the revolution speed of the cavity planetary gear carrier, thereby, the increase of the power density of the bucket wheel is slow in this structure, and it is not suitable for the condition where a rapid increase of output torque is required. A continuously variable transmission with a simple structure is provided in which the rotation speed of the bucket wheel is not affected by the increase multiple of the output torque.

To this end, the technical solution of the present invention is a continuously variable transmission including an input end planetary gear set and an output end planetary gear set, a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing close to the cavity input end cover is provided with a bucket wheel planetary gear set.

The input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the input shaft passes through the cavity input end cover and is rotatably coupled to the cavity input end cover, and the planetary gear connecting shafts pass through the cavity output end cover and are rotatably coupled to the cavity output end cover.

The output end planetary gear set includes an output end sun gear and output end planetary gears, an output shaft is disposed in middle of the output end sun gear, the output end sun gear is engaged with the output end planetary gears, the output end planetary gears are fixedly connected to the planetary gear connecting shafts that pass through the cavity output end cover.

The bucket wheel planetary gear set includes a bucket wheel sun gear and bucket wheel planetary gears, the bucket wheel sun gear is engaged with the bucket wheel planetary gears, the bucket wheel sun gear is fixedly connected to the input shaft that passes through the cavity input end cover; bucket wheel planetary gear shafts are disposed in middle of the bucket wheel planetary gears, one end of each of the bucket wheel planetary gear shafts is disposed on the cavity input end cover, and the other end of the bucket wheel planetary gear shaft is provided with a bucket wheel.

Preferably, one side of the inside of the bucket wheel cavity housing close to the bucket wheel planetary gear set is provided with a bushing, the input shaft that passes through the cavity input end cover is rotatably coupled to the bushing, and the bucket wheel planetary gear shaft passes through the bushing and is rotatably coupled to the bushing.

Preferably, a number of the input end planetary gears of the input end planetary gear set is three or more.

Preferably, a number of the output end planetary gears of the output end planetary gear set is three or more.

Preferably, a number of the bucket wheel planetary gears of the bucket wheel planetary gear set is three or more.

Preferably, a portion of the input shaft in the inside of the bucket wheel cavity housing is provided with a bucket wheel.

A continuously variable transmission includes a bucket wheel planetary gear set and an output end planetary gear set, a cavity planetary gear carrier is disposed on an inward side of the bucket wheel planetary gear set, the cavity planetary gear carrier includes a cavity input end cover and a cavity output end cover, a bucket wheel cavity housing is fixedly disposed between the cavity input end cover and the cavity output end cover, and an input end planetary gear set is disposed between the cavity input end cover and the bucket wheel cavity housing.

The bucket wheel planetary gear set includes a bucket wheel sun gear and bucket wheel planetary gears, the bucket wheel sun gear is engaged with the bucket wheel planetary gears, an input shaft is disposed in middle of the bucket wheel sun gear, the input shaft passes through the cavity input end cover and is rotatably coupled to the cavity input end cover, bucket wheel planetary gear shafts are disposed in middle of the bucket wheel planetary gears, the bucket wheel planetary gear shafts pass through the cavity input end cover and the bucket wheel cavity housing and are rotatably coupled to the cavity input end cover and the bucket wheel cavity housing, and a portion of each of the bucket wheel planetary gear shafts in inside of the bucket wheel cavity housing is provided with a bucket wheel.

The output end planetary gear set includes an output end sun gear and output end planetary gears, an output shaft is disposed in middle of the output end sun gear, the output end sun gear is engaged with the output end planetary gears, planetary gear connecting shafts are disposed in middle of the output end planetary gears, the planetary gear connecting shafts pass through the cavity output end cover and the bucket wheel cavity housing and are rotatably coupled to the cavity output end cover and the bucket wheel cavity housing.

The input end planetary gear set includes an input end sun gear and input end planetary gears, the input end sun gear is engaged with the input end planetary gears, the input end planetary gears are fixedly connected to the planetary gear connecting shafts that pass through the cavity output end cover and the bucket wheel cavity housing, the input end sun gear is fixedly connected to the input shaft that passes through the cavity input end cover.

Preferably, a number of the input end planetary gears of the input end planetary gear set is three or more.

Preferably, a number of the output end planetary gears of the output end planetary gear set is three or more.

Preferably, a number of the bucket wheel planetary gears of the bucket wheel planetary gear set is three or more.

The present invention has the effects that: since the continuously variable transmission includes an input end planetary gear set and an output end planetary gear set, a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing close to the cavity input end cover is provided with a bucket wheel planetary gear set, it is possible to realize an activation with a speed of zero and a rapid activation with no external resistance upon activation, and the transmission procedure is flexible; it is possible to realize a setting of increasing torque in multiples, the range of torque change is wide, and the rated working condition is synchronized; it is possible to realize a wide range of automatic matching of torque and speed through a self-adaptive adjustment without a control apparatus; and it is possible to be applicable in a situation of a high-power flexible transmission.

SYMBOLS IN THE DRAWINGS

1 input shaft; 2 input end sun gear; 3 input end planetary gear; 4 planetary gear connecting shaft; 5 bearing; 6 cavity input end cover; 7 bucket wheel; 8 bucket wheel planetary gear; 9 bucket wheel sun gear; 10 output end sun gear; 11 output shaft; 12 bushing; 13 cavity output end cover; 14 bucket wheel cavity housing; 15 output end planetary gear; 16 bucket wheel cavity internal fluid; 17 bucket wheel planetary gear shaft; 101 input end planetary gear set; 102 output end planetary gear set; 103 bucket wheel planetary gear set; 104 cavity planetary gear carrier.

DESCRIPTION OF THE EMBODIMENTS

The present invention will be further described below in conjunction with the embodiments.

Embodiment 1

Figure 1:
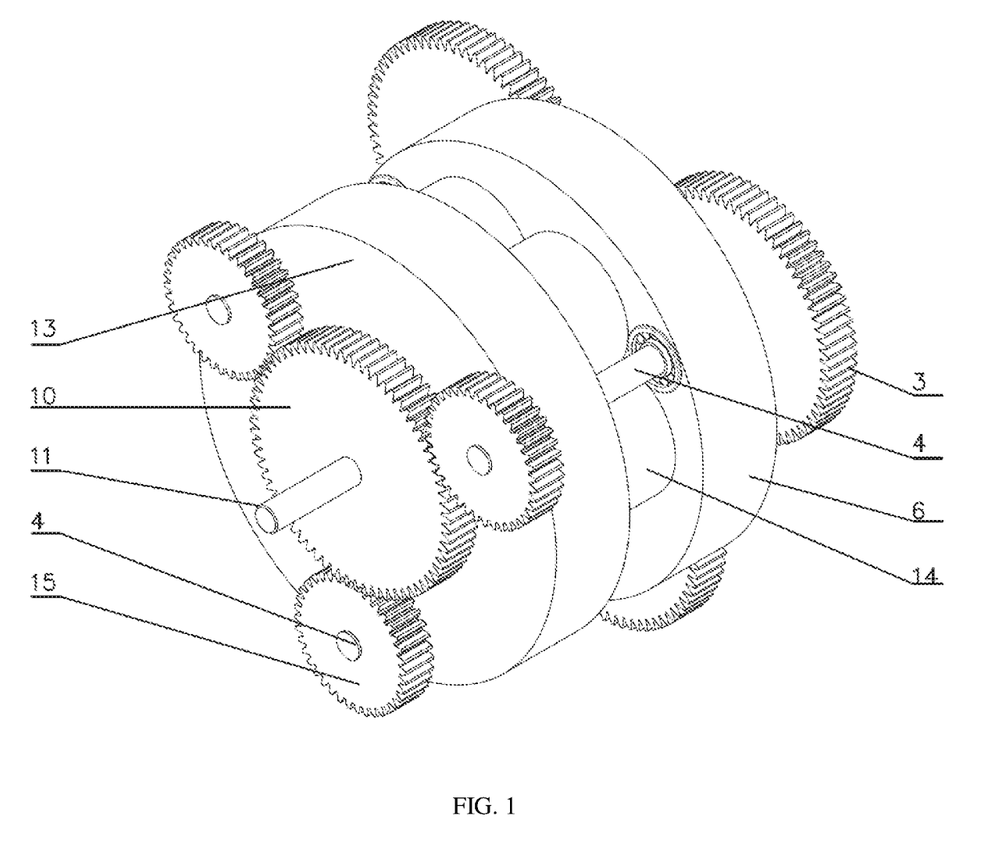
FIG. 1 is an axonometric view of Embodiment 1 of the present invention.
Figure 2:
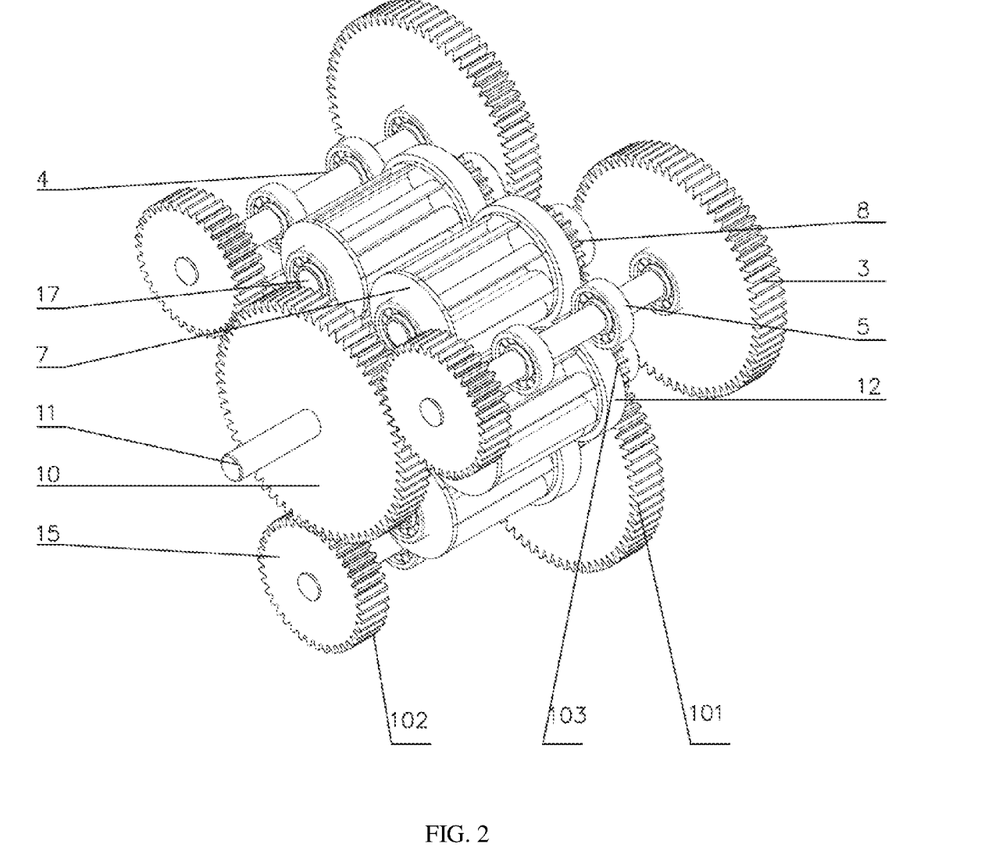
FIG. 2 is another axonometric view of Embodiment 1 of the present invention.
Figure 3:
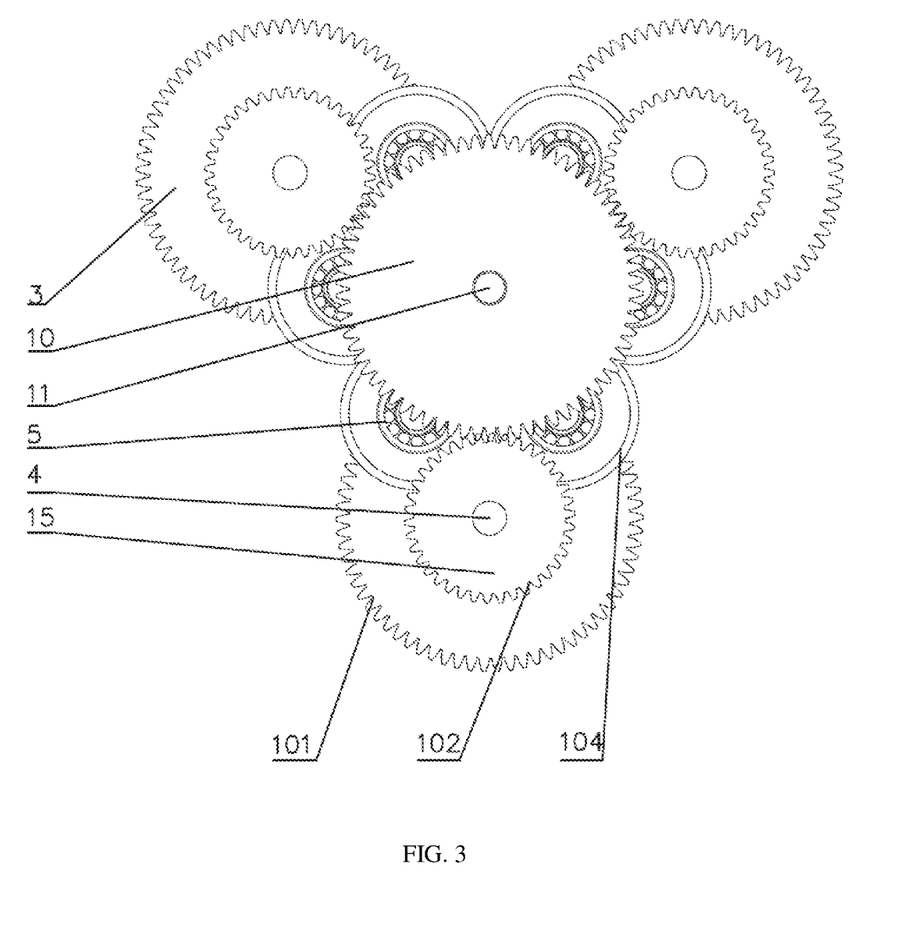
FIG. 3 is a front view of Embodiment 1 of the present invention.
Figure 4:
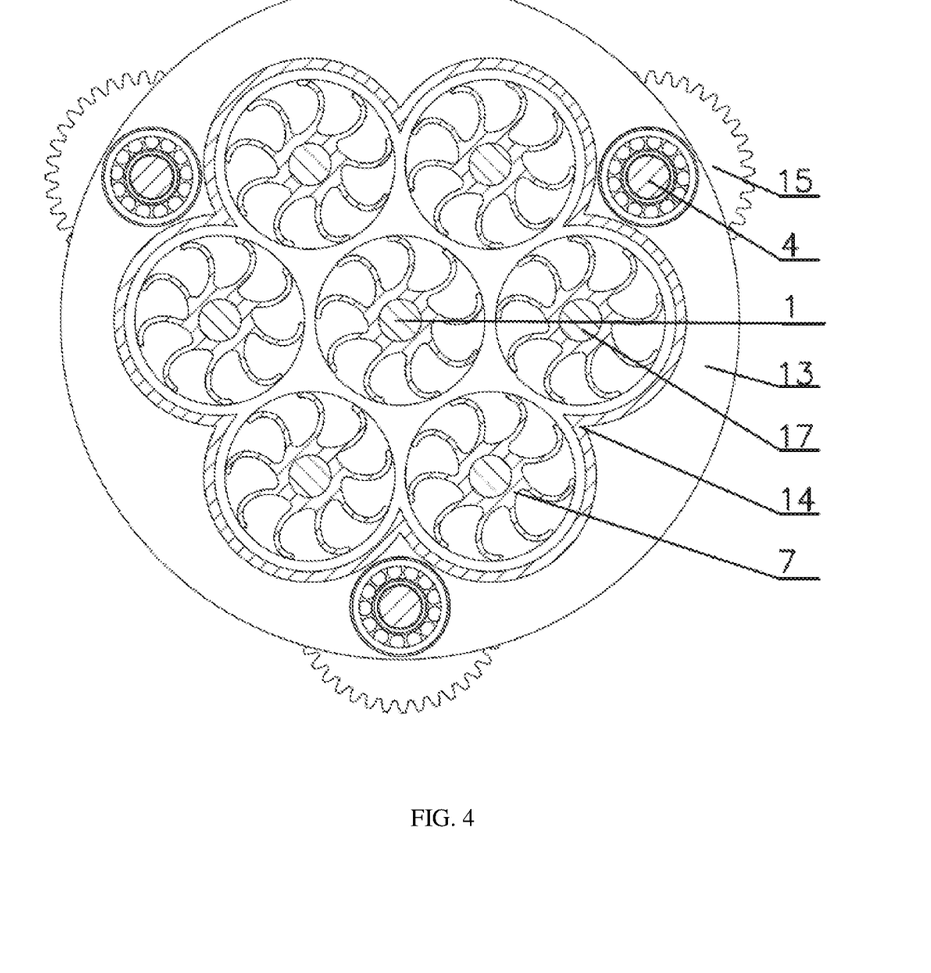
FIG. 4 is a rear view of Embodiment 1 of the present invention.
Figure 5:
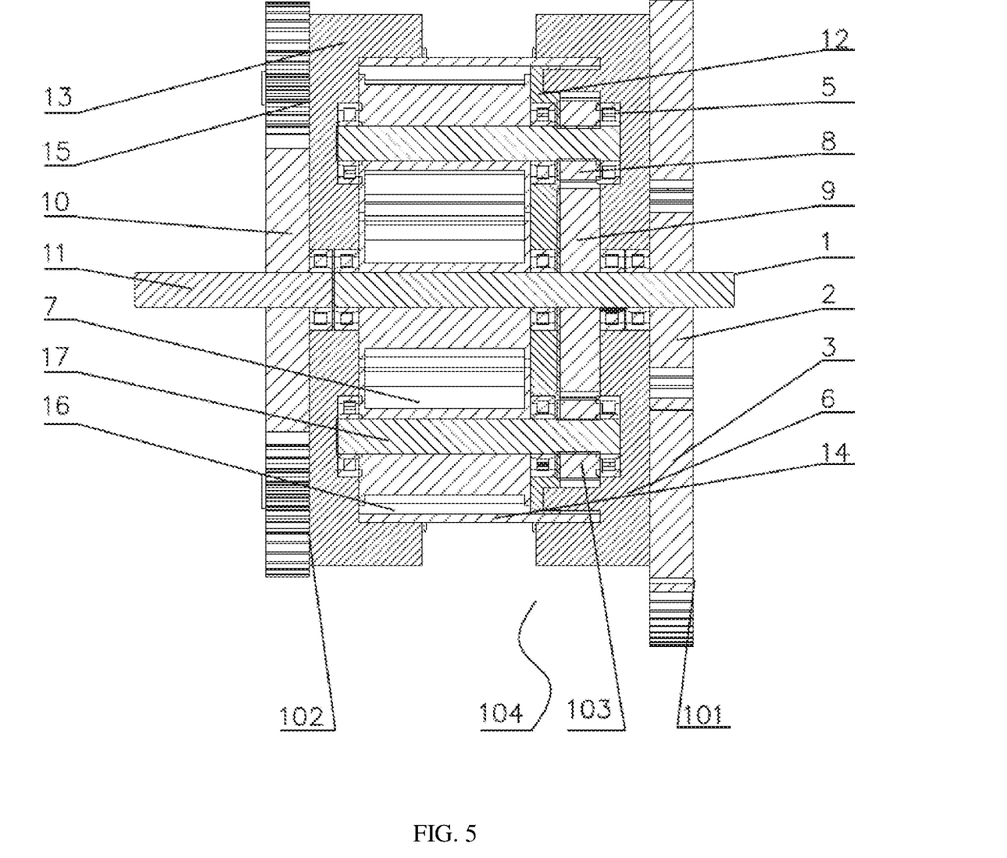
FIG. 5 is a side view of Embodiment 1 of the present invention.

FIG. 1 to FIG. 5 show a continuously variable transmission of an embodiment of the present invention, which is provided with an input end planetary gear set 101 and an output end planetary gear set 102. A cavity planetary gear carrier 104 is disposed between the input end planetary gear set 101 and the output end planetary gear set 102. The cavity planetary gear carrier 104 includes a cavity input end cover 6 and a cavity output end cover 13. A bucket wheel cavity housing 14 is fixedly disposed between the cavity input end cover 6 and the cavity output end cover 13. An inward side of the input end planetary gear set 101 is connected to the cavity input end cover 6. An inward side of the output end planetary gear set 102 is connected to the cavity output end cover 13. One side of inside of the bucket wheel cavity housing 14 close to the cavity input end cover 6 is provided with a bucket wheel planetary gear set 103. The input end planetary gear set 101 includes one input end sun gear 2 and three input end planetary gears 3. An input shaft 1 is disposed in middle of the input end sun gear 2. The input end sun gear 2 is engaged with the input end planetary gears 3. Planetary gear connecting shafts 4 are disposed in middle of the input end planetary gears 3. The planetary gear connecting shafts 4 pass through the cavity input end cover 6 and are rotatably coupled to the cavity input end cover 6. The input shaft 1 passes through the cavity input end cover 6 and is rotatably coupled to the cavity input end cover 6. The planetary gear connecting shafts 4 pass through the cavity output end cover 13 and are rotatably coupled to the cavity output end cover 13. The output end planetary gear set 102 includes one output end sun gear 10 and three output end planetary gears 15. An output shaft 11 is disposed in middle of the output end sun gear 10. The output end sun gear 10 is engaged with the output end planetary gears 15. The output end planetary gears 15 are fixedly connected to the planetary gear connecting shafts 4 that pass through the cavity output end cover 13. The bucket wheel planetary gear set 103 includes one bucket wheel sun gear 9 and six bucket wheel planetary gears 8. The bucket wheel sun gear 9 is engaged with the bucket wheel planetary gears 8. The bucket wheel sun gear 9 is fixedly connected to the input shaft 1 that passes through the cavity input end cover 6. Bucket wheel planetary gear shafts 17 are disposed in middle of the bucket wheel planetary gears 8. One end of each of the bucket wheel planetary gear shafts 17 is disposed on the cavity input end cover 6 and is rotatably coupled thereto, and the other end of the bucket wheel planetary gear shaft 17 is fixedly provided with a bucket wheel 7. One side of the inside of the bucket wheel cavity housing 14 close to the bucket wheel planetary gear set 103 is provided with a bushing 12. The input shaft 1 that passes through the cavity input end cover 6 is rotatably coupled to the bushing 12. The bucket wheel planetary gear shaft 17 passes through the bushing 12 and is rotatably coupled to the bushing 12. An appropriate amount of bucket wheel cavity internal fluid 16 is filled between the bushing 12 and the cavity output end cover 13. A portion of the input shaft 1 in the inside of the bucket wheel cavity housing 14 is provided with a bucket wheel 7.

The bucket wheel planetary gear 8 and the bucket wheel 7 may be formed as an integral structure, and the other end of the bucket wheel 7 may adopt a cantilever structure or a support structure to adapt to various transmissions having different volume requirements.

In the present embodiment, the number of teeth of the input end sun gear 2 is 35, and the number of teeth of the input end planetary gear 3 is 70; the number of teeth of the output end planetary gear 15 is 35, and the number of teeth of the output end sun gear 10 is 70. The torque output by the output shaft 11 is in a range that is 4 times of the torque provided by the input shaft 1.

The number of teeth of the bucket wheel planetary gear 8 is 20, and the number of teeth of the bucket wheel sun gear 9 is 50. The maximum balance torque that may be provided by the bucket wheel gear set 103 to the output shaft 11 is in a range that is 2.5 times of the resistance torque subjected by the combination of the bucket wheels 7 against the bucket wheel cavity internal fluid 16.

The operation procedure is as follows. At the activation, the power is set to be input clockwise. As the power is input from the input shaft 1, the input end sun gear 2 is driven to rotate clockwise. The input end sun gear 2 drives the input end planetary gear 3 to rotate counterclockwise and further drives, through the fixedly connected planetary gear connecting shaft 4, the output end planetary gear 15 to rotate, meanwhile, the output end sun gear 10 subjects a resistance from the output shaft 11. The output end planetary gear 15 revolves counterclockwise around the output end sun gear 10 and drives the cavity planetary gear carrier 104 to revolve counterclockwise. Meanwhile, the input shaft 1 rotates clockwise, and drives the bucket wheel sun gear 9 that is fixedly connected to the input shaft 1 to rotate clockwise and the bucket wheel planetary gear 8 to rotate counterclockwise, thereby driving the bucket wheel 7 to rotate counterclockwise. The number of counterclockwise rotation of the bucket wheel 7 exceeds the number of counterclockwise revolution of the cavity planetary gear carrier 104. The bucket wheel 7 subjects a resistance of the bucket wheel cavity internal fluid 16 in the bucket wheel cavity housing 14 due to the counterclockwise rotation so as to form a torque, in which the resistance includes the fluid gravity formed by the revolution of the bucket wheel cavity housing 14, the hydraulic power formed by the injection of the fluid leaving a bucket wheel 7 to an adjacent bucket wheel 7, and the fluid adhesion force of the fluid between the bucket wheel 7 and the bucket wheel cavity housing 14. The torque is transmitted to the input shaft 1, to which the bucket wheel sun gear 9 is fixedly connected, in multiples by means of the diameter change of the bucket wheel planetary gear 8 and the bucket wheel sun gear 9. The input shaft 1 provides the torque for driving, this torque is transferred to the cavity planetary gear carrier 104 at the same time and is converted into a torque that prevents the cavity planetary gear carrier 104 from revolving, and further drives the output end planetary gear 15 to against force from the output end sun gear 10, thereby the output end sun gear 10 drives the output shaft 11 to output power. The resistance of the bucket wheel cavity internal fluid 16 to the bucket wheel 7 is 0 at the beginning, and as the rotation speed of the input shaft 1 increases, the resistance of the bucket wheel cavity internal fluid 16 to the bucket wheel 7 increases in multiples, thereby the output end sun gear 10 drives the output shaft 11 to rotate so as to output power through the output shaft 11.

During the above procedure: at the beginning of the activation, the continuously variable transmission of the present Embodiment 1 is free from the external resistance and activates with a speed of zero; in the middle of the activation, the resistance subjected by the combination of the bucket wheels 7 is rapidly increased, and finally, the output end planetary gear 15 drives, through the output end sun gear 10, the output shaft 11 to flexibly activate; in the rated working condition, the speed and the torque are stable with respect to each other, and since the forces subjected by the bucket wheel 7 are balanced, the bucket wheel 7 does not rotate around itself and the wheels do not rotate with respect to each other, thereby the synchronous transmission of power is realized as a whole, approaching a transmission having a ratio 1:1; the torque is automatically adjusted to be balanced with the speed when the forces are unbalanced, and the torque output by the output shaft 11 of the continuously variable transmission of the present Embodiment 1 is 4 times of the maximum torque provided by the input shaft 1.

Upon activation, the fluid in a bucket wheel 7 is impacted to another bucket wheel 7 adjacent to the bucket wheel 7 by the driving of a centrifugal force so as to form a hydraulic power, and the formula for the hydraulic power is $F=m\omega^2 r$. Compared with the technical solution in the invention application No. 201710055648.2 in which the bucket wheel planetary gear set 103 is disposed on the side of the cavity output end cover 13, in the technical solution in the present Embodiment 1 in which the bucket wheel planetary gear set 103 is disposed on the side of the cavity input end cover 6, the rotation speed of the bucket wheel 7 of the technical solution in the present Embodiment 1 is 4 times that of the technical solution in the invention application No. 201710055648.2 in which the bucket wheel planetary gear set 103 is disposed on the side of the cavity output end cover 13, and since the force is the square of the number of rotations, the hydraulic power is 16 times, thereby, the effect of rapid increase of the torque is achieved, and it is suitable for the condition where a rapid increase of output torque is required.

The number of teeth of the input end sun gear 2 and the number of teeth of the input end planetary gear 3 as well as the transmission ratio of other transmission pairs may be modified according to the needs of different application fields, so as to optimally adjust the amount of the required torque and achieve the output of various speeds and torques.

Embodiment 2

Figure 6:
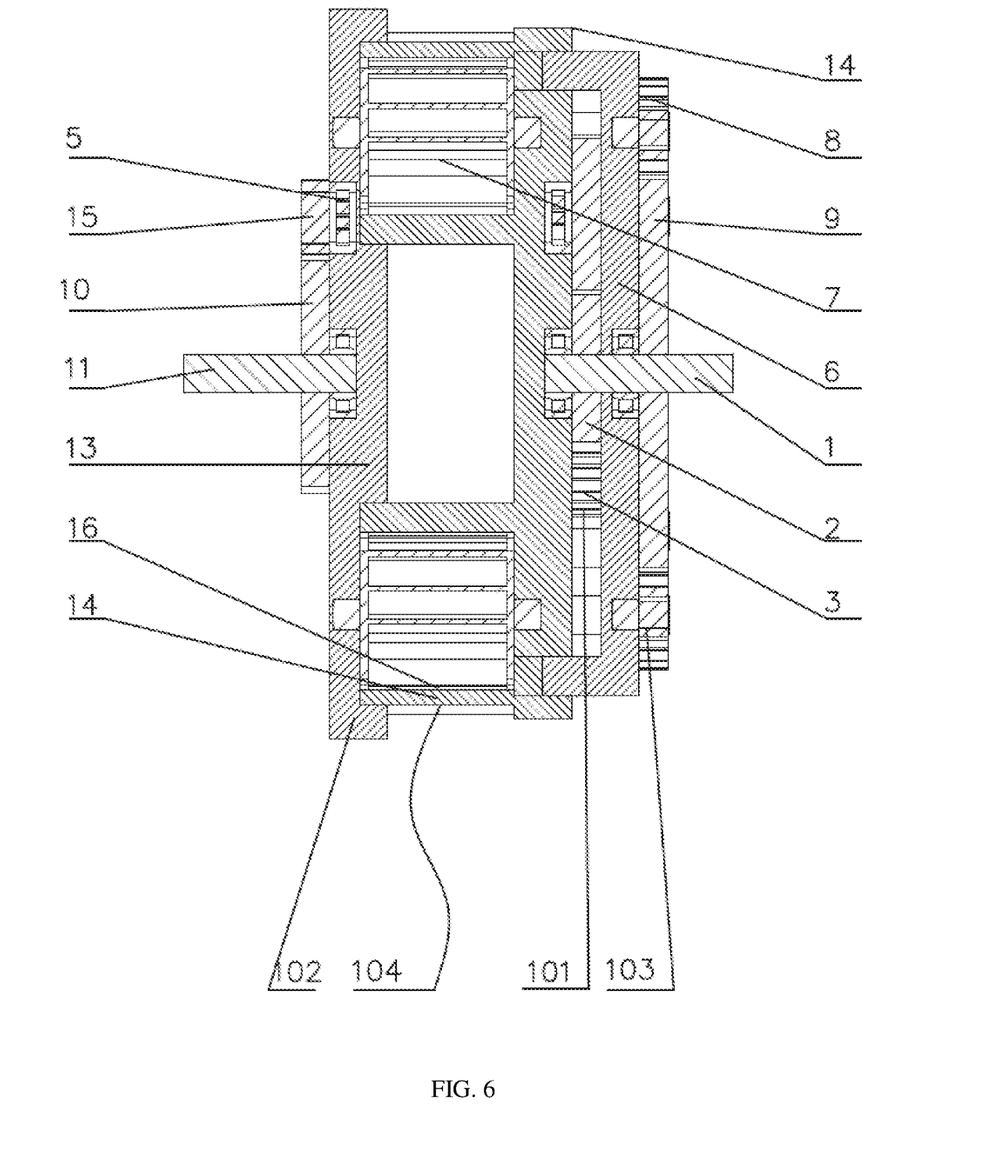
FIG. 6 is a schematic view of Embodiment 2 of the present invention.
Figure 7:
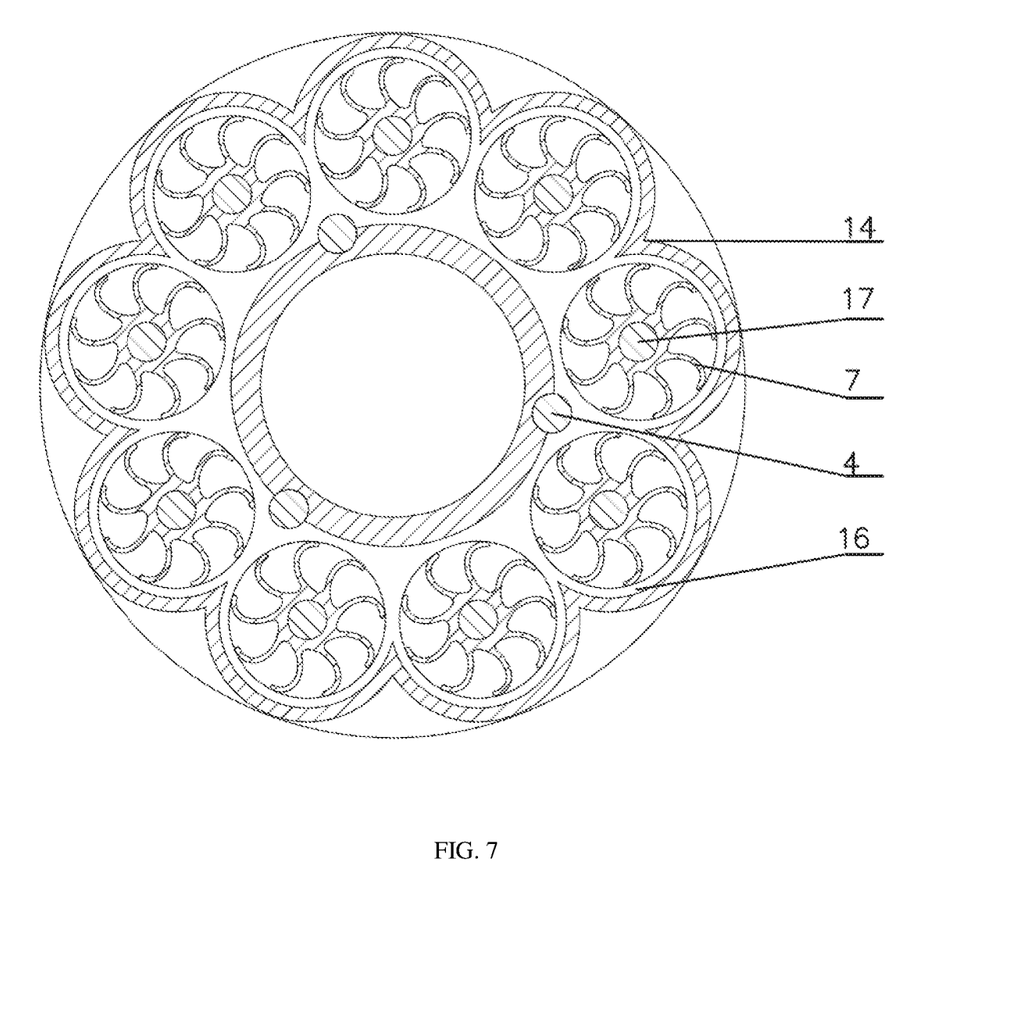
FIG. 7 is a front view of Embodiment 2 of the present invention.
Figure 8:
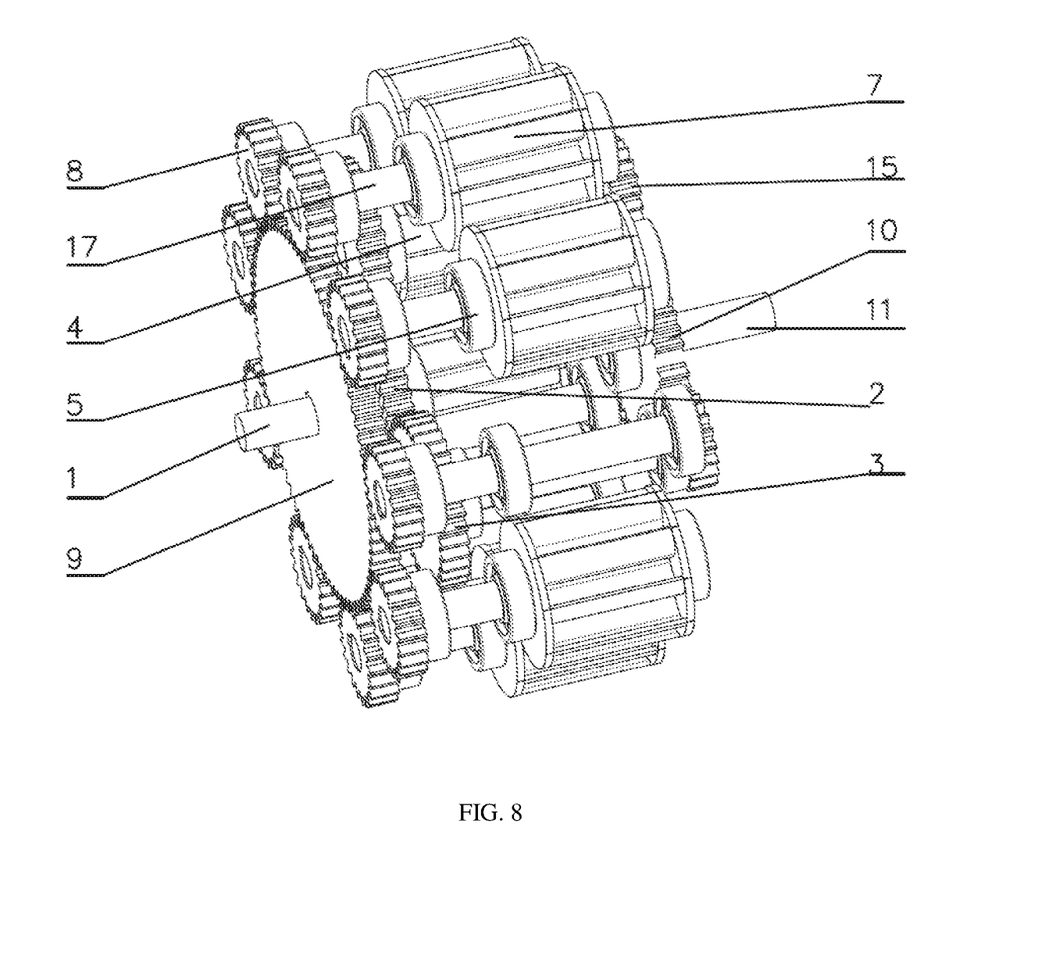
FIG. 8 is an axonometric view of Embodiment 2 of the present invention.
Figure 9:
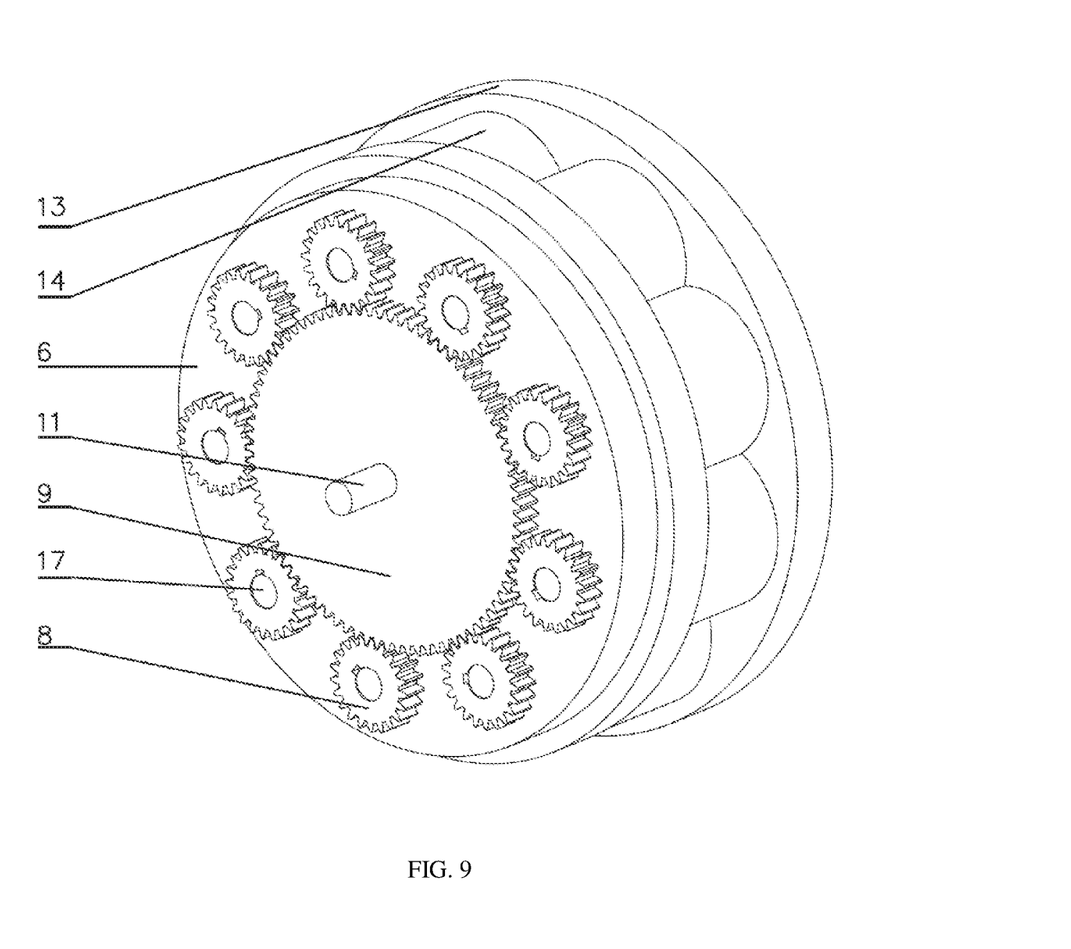
FIG. 9 is another axonometric view of Embodiment 2 of the present invention.

FIG. 6 to FIG. 9 show a continuously variable transmission of Embodiment 2 of the present invention, which is provided with a bucket wheel planetary gear set 103 and an output end planetary gear set 102. A cavity planetary gear carrier 104 is disposed on an inward side of the bucket wheel planetary gear set 103. The cavity planetary gear carrier 104 includes a cavity input end cover 6 and a cavity output end cover 13. A bucket wheel cavity housing 14 is fixedly disposed between the cavity input end cover 6 and the cavity output end cover 13. An input end planetary gear set 101 is disposed between the cavity input end cover 6 and the bucket wheel cavity housing 14. The bucket wheel planetary gear set 103 includes one bucket wheel sun gear 9 and nine bucket wheel planetary gears 8. The bucket wheel sun gear 9 is engaged with the bucket wheel planetary gears 8. An input shaft 1 is disposed in middle of the bucket wheel sun gear 9. The input shaft 1 passes through the cavity input end cover 6 and is rotatably coupled to the cavity input end cover 6. Bucket wheel planetary gear shafts 17 are disposed in middle of the bucket wheel planetary gears 8. The bucket wheel planetary gear shafts 17 pass through the cavity input end cover 6 and the bucket wheel cavity housing 14 and are rotatably coupled to the cavity input end cover 6 and the bucket wheel cavity housing 14. A portion of each of the bucket wheel planetary gear shafts 17 in inside of the bucket wheel cavity housing 14 is fixedly provided with a bucket wheel. The output end planetary gear set 102 includes one output end sun gear 10 and three output end planetary gears 15. An output shaft 11 is disposed in middle of the output end sun gear 10. The output end sun gear 10 is engaged with the output end planetary gears 15. Planetary gear connecting shafts 4 are disposed in middle of the output end planetary gears 15. The planetary gear connecting shafts 4 pass through the cavity output end cover 13 and the bucket wheel cavity housing 14 and are rotatably coupled to the cavity output end cover 13 and the bucket wheel cavity housing 14. The input end planetary gear set 101 includes input end sun gear 2 and input end planetary gears 3. The input end sun gear 2 is engaged with the input end planetary gears 3. The input end planetary gears 3 are fixedly connected to the planetary gear connecting shafts 4 that pass through the cavity output end cover 13 and the bucket wheel cavity housing 14. The input end sun gear 2 is fixedly connected to the input shaft 1 that passes through the cavity input end cover 6. An appropriate amount of bucket wheel cavity internal fluid 16 is filled in the bucket wheel cavity housing 14.

Embodiment 2 modifies the planetary gear connecting shaft 4 from the outside of the bucket wheel cavity housing 14 to the inside of the bucket wheel cavity housing 14 and cancels the bucket wheel 7 at the center of the bucket wheel cavity housing 14 on the basis of Embodiment 1. The results are that: the diameters of the gears in the input end planetary gear set 101 and the output end planetary gear set 102 become small, but the diameter ratio of one another is not affected; the positions of the bucket wheel planetary gear set 103 and the input end planetary gear set 101 are interchanged; the outer diameter of the bucket wheel planetary gear set 103 is increased and the number of the bucket wheels 7 is increased, so that the centrifugal acceleration of the bucket wheel cavity internal fluid 16 is increased, and the fluid gravity, the fluid adhesion force and the hydraulic power thus subjected by the bucket wheel 7 are increased; and the bushing 12 is incorporated with the bucket wheel cavity housing 14.

In the present Embodiment 2, the number of teeth of the input end sun gear 2 is 20, and the number of teeth of the input end planetary gear 3 is 40; the number of teeth of the output end planetary gear 15 is 20, and the number of teeth of the output end sun gear 10 is 40. The torque output by the output shaft 11 is in a range that is 4 times of the torque provided by the input shaft 1.

The number of teeth of the bucket wheel planetary gear 8 is 25, and the number of teeth of the bucket wheel sun gear 9 is 75. The maximum balance torque that may be provided by the bucket wheel gear set 103 to the output shaft 11 is in a range that is 3 times of the resistance torque subjected by the combination of the bucket wheels 7 against the bucket wheel cavity internal fluid 16.

The operation procedure is as follows. At the activation, the power is set to be input clockwise. As the power is input from the input shaft 1, the bucket wheel sun gear 9 and the input end sun gear 2 are driven to rotate clockwise. The input end sun gear 2 drives the input end planetary gear 3 to rotate counterclockwise and further drives, through the fixedly connected planetary gear connecting shaft 4, the output end planetary gear 15 to rotate, meanwhile, the output end sun gear 10 subjects a resistance from the output shaft 11. The output end planetary gear 15 revolves counterclockwise around the output end sun gear 10 and drives the cavity planetary gear carrier 104 to revolve counterclockwise. The bucket wheel sun gear 9 drives the bucket wheel planetary gear 8 to rotate counterclockwise, thereby driving the bucket wheel 7 to rotate counterclockwise. The number of counterclockwise rotation of the bucket wheel 7 exceeds the number of counterclockwise revolution of the cavity planetary gear carrier 104. The bucket wheel 7 subjects a resistance of the bucket wheel cavity internal fluid 16 in the bucket wheel cavity housing 14 due to the counterclockwise rotation so as to form a torque, in which the resistance includes the fluid gravity formed by the revolution of the bucket wheel cavity housing 14, the hydraulic power formed by the injection of the fluid leaving a bucket wheel 7 to an adjacent bucket wheel 7, and the fluid adhesion force of the fluid between the bucket wheel 7 and the bucket wheel cavity housing 14. The torque is transmitted to the input shaft 1, to which the bucket wheel sun gear 9 is fixedly connected, in multiples by means of the diameter change of the bucket wheel planetary gear 8 and the bucket wheel sun gear 9. The input shaft 1 provides the torque for driving, this torque is transferred to the cavity planetary gear carrier 104 at the same time and is converted into a torque that prevents the cavity planetary gear carrier 104 from revolving, and further drives the output end planetary gear 15 to against force from the output end sun gear 10, thereby the output end sun gear 10 drives the output shaft 11 to output power. The resistance of the bucket wheel cavity internal fluid 16 to the bucket wheel 7 is 0 at the beginning, and as the rotation speed of the input shaft 1 increases, the resistance of the bucket wheel cavity internal fluid 16 to the bucket wheel 7 increases in multiples, thereby the output end sun gear 10 drives the output shaft 11 to rotate so as to output power through the output shaft 11.

During the above procedure: at the beginning of the activation, the continuously variable transmission of the present Embodiment 2 is free from the external resistance and activates with a speed of zero; in the middle of the activation, the resistance subjected by the combination of the bucket wheels 7 is uniformly increased, and finally, the output end planetary gear 15 drives, through the output end sun gear 10, the output shaft 11 to flexibly activate; in the rated working condition, the speed and the torque are stable with respect to each other, and since the forces subjected by the bucket wheel 7 are balanced, the bucket wheel 7 does not rotate around itself and the wheels do not rotate with respect to each other, thereby the synchronous transmission of power is realized as a whole, approaching a transmission having a ratio 1:1; the torque is automatically adjusted to be balanced with the speed when the forces are unbalanced, and the torque output by the output shaft 11 of the continuously variable transmission of the present Embodiment 2 is in a range that is 4 times of the torque provided by the input shaft 1.

Upon activation, the hydraulic power of the fluid in a bucket wheel 7 to an adjacent bucket wheel 7 is the main power, and the formula for the hydraulic power is $F=m\omega^2 r$. In the present Embodiment 2, the bucket wheel planetary gear set 103 is disposed on the side of the cavity input end cover 6, the rotation speed of the bucket wheel 7 thereof is 4 times that of the case where the bucket wheel planetary gear set 103 is disposed on the side of the cavity output end cover 13, and since the force is the square of the number of rotations, the hydraulic power is 16 times, thereby, the effect of rapid increase of the torque is achieved.

The above is only the specific embodiments of the present invention, and the scope of the present invention is not limited thereto, and thus all of the replacement of the equivalent components thereof, or the equivalent changes and modifications made according to the claimed scope of the present invention should still fall within the scope encompassed by the claims of the present invention.

The invention claimed is:

1. A continuously variable transmission, comprising an input end planetary gear set and an output end planetary gear set, wherein a cavity planetary gear carrier is disposed between the input end planetary gear set and the output end planetary gear set, the cavity planetary gear carrier includes a cavity input end cover and a cavity output end cover, a bucket wheel cavity housing is fixedly disposed between the cavity input end cover and the cavity output end cover, an inward side of the input end planetary gear set is connected to the cavity input end cover, an inward side of the output end planetary gear set is connected to the cavity output end cover, and one side of inside of the bucket wheel cavity housing is provided with a bucket wheel planetary gear set;

the input end planetary gear set includes an input end sun gear and input end planetary gears, an input shaft is disposed in middle of the input end sun gear, the input end sun gear is engaged with the input end planetary gears, planetary gear connecting shafts are disposed in middle of the input end planetary gears, the planetary gear connecting shafts pass through the cavity input end cover and are rotatably coupled to the cavity input end cover, the input shaft passes through the cavity input end cover and is rotatably coupled to the cavity input end cover, and the planetary gear connecting shafts pass through the cavity output end cover and are rotatably coupled to the cavity output end cover;

the output end planetary gear set includes an output end sun gear and output end planetary gears, an output shaft is disposed in middle of the output end sun gear, the output end sun gear is engaged with the output end planetary gears, the output end planetary gears are fixedly connected to the planetary gear connecting shafts that pass through the cavity output end cover; and the bucket wheel planetary gear set includes a bucket wheel sun gear and bucket wheel planetary gears, the bucket wheel sun gear is engaged with the bucket wheel planetary gears, the bucket wheel sun gear is fixedly connected to the input shaft that passes through the cavity input end cover; bucket wheel planetary gear shafts are disposed in middle of the bucket wheel planetary gears, one end of each of the bucket wheel planetary gear shafts is disposed on the cavity input end cover, and the other end of the bucket wheel planetary gear shaft is provided with a bucket wheel.

2. The continuously variable transmission according to claim 1, wherein one side of the inside of the bucket wheel cavity housing close to the bucket wheel planetary gear set is provided with a bushing, the input shaft that passes through the cavity input end cover is rotatably coupled to the bushing, and the bucket wheel planetary gear shaft passes through the bushing and is rotatably coupled to the bushing.

3. The continuously variable transmission according to claim 1, wherein a number of the input end planetary gears of the input end planetary gear set is three or more.

4. The continuously variable transmission according to claim 1, wherein a number of the output end planetary gears of the output end planetary gear set is three or more.

5. The continuously variable transmission according to claim 1, wherein a number of the bucket wheel planetary gears of the bucket wheel planetary gear set is three or more.

6. The continuously variable transmission according to claim 1, wherein a portion of the input shaft in the inside of the bucket wheel cavity housing is provided with a bucket wheel.

7. A continuously variable transmission, comprising a bucket wheel planetary gear set and an output end planetary gear set, wherein a cavity planetary gear carrier is disposed on an inward side of the bucket wheel planetary gear set, the cavity planetary gear carrier includes a cavity input end cover and a cavity output end cover, a bucket wheel cavity housing is fixedly disposed between the cavity input end cover and the cavity output end cover, and an input end planetary gear set is disposed between the cavity input end cover and the bucket wheel cavity housing;

the bucket wheel planetary gear set includes a bucket wheel sun gear and bucket wheel planetary gears, the bucket wheel sun gear is engaged with the bucket wheel planetary gears, an input shaft is disposed in middle of the bucket wheel sun gear, the input shaft passes through the cavity input end cover and is rotatably coupled to the cavity input end cover, bucket wheel planetary gear shafts are disposed in middle of the bucket wheel planetary gears, the bucket wheel planetary gear shafts pass through the cavity input end cover and the bucket wheel cavity housing and are rotatably coupled to the cavity input end cover and the bucket wheel cavity housing, and a portion of each of the bucket wheel planetary gear shafts in inside of the bucket wheel cavity housing is provided with a bucket wheel;

the output end planetary gear set includes an output end sun gear and output end planetary gears, an output shaft is disposed in middle of the output end sun gear, the output end sun gear is engaged with the output end planetary gears, planetary gear connecting shafts are disposed in middle of the output end planetary gears, the planetary gear connecting shafts pass through the cavity output end cover and the bucket wheel cavity housing and are rotatably coupled to the cavity output end cover and the bucket wheel cavity housing; and the input end planetary gear set includes an input end sun gear and input end planetary gears, the input end sun gear is engaged with the input end planetary gears, the input end planetary gears are fixedly connected to the planetary gear connecting shafts that pass through the cavity output end cover and the bucket wheel cavity housing, the input end sun gear is fixedly connected to the input shaft that passes through the cavity input end cover.

8. The continuously variable transmission according to claim 7, wherein a number of the input end planetary gears of the input end planetary gear set is three or more.

9. The continuously variable transmission according to claim 7, wherein a number of the output end planetary gears of the output end planetary gear set is three or more.

10. The continuously variable transmission according to claim 7, wherein a number of the bucket wheel planetary gears of the bucket wheel planetary gear set is three or more.

* * * * *